United States Patent
Page

(10) Patent No.: US 6,464,134 B1
(45) Date of Patent: Oct. 15, 2002

(54) SYSTEM AND METHOD FOR VERIFYING THE AUTHENTICITY OF A CHECK AND AUTHORIZING PAYMENT THEREOF

(76) Inventor: Terri Page, 6032 NW. 8th Ave., Miami, FL (US) 33127

(*) Notice: Subject to any disclaimer, the term of this patent is extended or adjusted under 35 U.S.C. 154(b) by 0 days.

(21) Appl. No.: 09/458,974

(22) Filed: Dec. 10, 1999

(51) Int. Cl.[7] .......................... G06F 17/60; G06F 17/00; G06F 7/08; G06K 5/00

(52) U.S. Cl. ........................ 235/379; 235/375; 235/380; 235/381; 705/43; 705/45

(58) Field of Search ................................ 235/375, 379, 235/381, 487, 380; 705/43, 45, 35, 39, 42, 44

(56) References Cited

U.S. PATENT DOCUMENTS

| | | | | |
|---|---|---|---|---|
| 4,321,672 A | * | 3/1982 | Braun et al. ................. | 364/408 |
| 5,023,782 A | * | 6/1991 | Lutz et al. ................... | 364/405 |
| 5,044,668 A | * | 9/1991 | Wright ......................... | 283/58 |
| 5,175,682 A | * | 12/1992 | Higashiyama et al. ...... | 364/408 |
| 5,457,305 A | * | 10/1995 | Akel et al. ................... | 235/379 |
| 5,890,141 A | * | 3/1999 | Carney et al. ................ | 705/45 |
| 5,896,298 A | * | 4/1999 | Richter .................. | 364/479.01 |
| 5,897,625 A | * | 4/1999 | Gustin et al. ................. | 705/43 |
| 6,036,344 A | * | 3/2000 | Goldenberg ................ | 364/408 |
| 6,038,553 A | * | 3/2000 | Hyde, Jr. ...................... | 705/45 |
| 6,073,121 A | * | 6/2000 | Ramzy .......................... | 705/45 |
| 6,164,528 A | * | 12/2000 | Hills et al. ................... | 235/379 |

FOREIGN PATENT DOCUMENTS

FR  2558622 A1 * 7/1985

\* cited by examiner

Primary Examiner—Karl D. Frech
Assistant Examiner—April A. Nowlin
(74) Attorney, Agent, or Firm—Malloy & Malloy, P.A.

(57) ABSTRACT

A system and method for verifying the authenticity of a bank check and authorizing payment of the bank check at any of a plurality of banks or check cashing agencies, wherein a payor or issuer of the check integrates account data normally pre-printed on the face of the check with individualized payee data, at least including payee identification and a value of the check, so as to define a first set of data, which is communicated to a processing center for temporary storage and eventual comparison. Upon presentation of the check for deposit or cashing, the bank or check cashing agency will establish a second set of data based on the pre-printed account data and the individualized payee data that appears on the face of the check presented. The second set of data is communicated to the processing center where the first and second sets of data are compared to assure that at least the payee identification and the value of the check are identical to the same information printed on the check at the issuing site. Upon such a positive comparison, a verification signal is communicated to the cashing terminal or site so as to authorize payment of the check. The system and method may also include communication with a central data system for purposes of isolating funds in the proper account on which the check is drawn at least in the amount of the value of the check.

24 Claims, 2 Drawing Sheets

SYSTEM AND METHOD FOR VERIFYING THE AUTHENTICITY OF A CHECK AND AUTHORIZING PAYMENT THEREOF

BACKGROUND OF THE INVENTION

1. Field of the Invention

This invention relates to a system and method for verifying the authenticity of a bank check at the time the check is presented for deposit or cashing, by comparing both the account data and the individualized payee data appearing on the face of the check with account data and individualized payee data added to the check, at the time the check was issued. A positive comparison comprises the content of the first and second sets of data being identical, and results in a verification of authenticity of the check and an authorization to pay, while the detection of any differences between the first and second sets of data will result in a non-verification signal being communicated to the site where the check is presented for deposit or cashing.

2. Description of the Related Art

As early as 1993, the American Bankers Association and the National Retail Federation sponsored an inter-industry task force, known as the Bank Check Fraud Task Force, for the purpose of examining a variety of possible solutions to the ever increasing problem associated with check fraud. The task force developed, among other solutions, a data sharing program for closed accounts. This program is designed to prevent people, who have outstanding checks due to retailers, from opening new accounts. For example, participating financial institutions report all checking accounts closed, for cause, to a central data base called Checks Systems. This central data base transmits the closed account information to the shared check authorization network (SCAN) data base. Participating banks use lay the SCAN information before opening new accounts, to detect repeat offenders. A participating bank can also use MICR information from a check presented with the applicant's driver's license number to check the SCAN file for any previous bad account activity.

Other attempts to solve the problems of check fraud include electronic check presentment, which is an electronic/paper method of expediting check collection. Participating banks exchange check payment information before physically presenting the checks for payment. The depository bank captures payment information from the MICR line of incoming checks and immediately transmits the information electronically to the paying bank. Later, the depository bank sends the actual check according to its normal paper deadline. During check posting, the paying bank identifies checks that should be returned and immediately notifies the depository bank. Supporters of this system believe that it speeds up processing, controls cost and reduces fraud by providing early notification of return items.

Another preventative measure directed to the avoiding of losses from fraudulent check presentation includes "positive pay", which allows a company and its bank to work together to detect check fraud by identifying items presented for payment that the company did not issue. In the typical case, the company electronically transmits to the bank a list of all checks issued on a particular date. The bank verifies the check received for payment against that list and pays only those items on the list. The system further allows the bank to reject checks that exceed a specific dollar amount or checks that carry dates that have long past (stale checks). The bank investigates rejected checks to find out if the items are fraudulent or in error. The bank only pays exception items which are approved directly by the issuing company.

Yet another preventive measure is termed "reverse positive pay" and is similar to "positive pay" but comprises a somewhat reversed processed. In practice, the issuing company, rather than the bank, maintains a list of the checks issued on a given date or over a given period. When the checks are presented for payment and clear through the Federal Reserve System, the Federal Reserve prepares a file of the check's account number, serial number and dollar amount and sends the file to the bank. The bank then sends the file to the issuing company, and the company compares the information received from its bank with its internal records. The company then informs the bank as to which checks match its internal information and the bank pays only those verified check items. Subsequently, the bank researches the checks that do not match, corrects any misreads or encoding errors, and determines if any items are fraudulent. The bank pays only "true" exceptions that can be reconciled with the company's files.

While the attempts, of the type set forth above are primarily applicable to prevent check fraud at the institutional level, there is still a need to protect the payor as well as retail establishments, at the retail level. More specifically, there is a need for a system designed and structured to protect companies or other payors, against check fraud, when the checks are subsequently presented for redemption at any of a large number of the banks or check cashing agencies. It is of course recognized that one or more systems do exist, wherein the bank, check cashing agency, or retail establishment use conventional telephone communication with a central data base for purposes of determining if adequate funds are available to cover the check presented. However such a system, while most applicable for use by certain retail establishments, does not protect against attempts to fraudulently alter either the payee or the value of the check. Also, known systems of the type set forth above are time consuming, and not particularly useful when a bank or other cashing agency is presented with a large number of checks over a short period of time, such as in the case of payroll checks.

Accordingly, there is a need in this area for a system and accompanying method to easily, quickly and efficiently accomplish verification of the authenticity of checks at the time the check is presented for payment or deposit. Such an improved system should be capable of withholding authorization for payment of the check until individualized payee data, comprising payee identification and value of the check, is compared with and accurately corresponds to the payee identification and value of the check, as intended and as originally printed on the bank check by the issuing company or payor. Such an improved system and method should also be capable of taking advantage of modern day computer and electronic communication facilities and thereby significantly reduce or eliminate any delay in accomplishing verification of check authenticity and authorization for payment at the site where the check is presented for deposit or cashing. In addition, such an improved system and accompanying method may also include communication with a central data system of the type associated with the existing automatic teller machine (ATM) networks for purpose of isolating or suspending funds of the payor in an amount at least equivalent to the value of the checks being issued.

SUMMARY OF THE INVENTION

The present invention is directed towards a system and an accompanying method for the processing of bank checks or other negotiable instruments in a manner which eliminates or significantly reduces the problems associated with check fraud. Check fraud of the type referred to herein includes, but is not limited to, alteration of the check by changing the payee and/or the value of the check from that originally intended by the person or company that issued the bank check. The system and method of the present invention, while particularly adaptable for use by companies periodically issuing a relative large number of checks, such as payroll checks, is also readily adaptable for use in the prevention of check fraud involving personal checks which may be typically presented for redemption or for payment of goods or services at a retail establishment.

More specifically, an individual, company or other entity representing the payor includes at least one terminal, hereinafter referred to as an "issuing terminal", which comprises sufficient processing capabilities to store and integrate various data. The issuing terminal further includes input facilities preferably in the form of both a scanner assembly, which may comprise an optical scanner or other electronic reader, and a manually activatable keyboard. In addition, a printer may be associated directly with the issuing terminal, so as to produce receipts and/or hard copies of the information or data regarding the one or more checks issued. It is emphasized that for purposes of clarity, the system and method of the present invention will be described with regard to the preparation and processing of a single bank check. However, it should be obvious that any number of such bank checks could be identically processed, such as when a company is preparing a number of payroll checks for any given pay period.

In initially preparing to issue a check, personnel at the issuing terminal preferably optically scan or electronically read the pre-printed account data appearing on the check, wherein such account data normally includes an account number, check number, bank routing number, etc. Along with the account data, individualized payee data is entered into the issuing terminal, either manually, such as by using the associated keyboard or by any other applicable means. Alternatively, the issuing terminal and the associated scanner assembly can be structured and/or have sufficient capabilities to also electronically read or identify the individualized payee data, which would be printed on the face of the bank check by computer, printer or other known or specifically modified hardware, such as by establishing a direct link or integral configuration between the issuing terminal of the present invention, and the facilities, such as a specific payroll software program, which are provided for the generation of the checks and/or account record keeping. In this situation the keyboard and associated printer, while available for other functions, would not be required to manually enter the aforementioned individualized payee data from the face of the check, as the initial entry and/or generation of the information for initial placement on the check can also serve to enter the information into the issuing terminal. It should also be noted that the issuing terminal could include scanning equipment, as part of its associated scanner assembly, which is structurally designed to function in a manner similar to the equipment used to "swipe" credit cards, and need not be an elaborate computer processor system. By virtue of such scanning techniques, both the account data as well as the payee data could be integrated into the processor and memory of the issuing terminal electronically, utilizing the scanning equipment having such "swipe" capabilities, and if necessary an associated key pad. Whether automatically or manually entered into the issuing terminal, the individualized payee data preferably includes the identity of the payee as well as the dollar amount or intended value of the bank check. Once entered, the processing facilities at the issuing terminal and the associated memory thereof, would serve to integrate the account data with the individualized payee data and thereby establish what may be referred to as a first set of data.

Once established, the first set of data is communicated by any applicable means to a processing center typically located remote from the issuing terminal. The processing center includes sufficient processing and computer facilities to accomplish at least initial or temporary storage of the first set of data for later processing in a manner which will assure the absence of check fraud, as will be explained in greater detail hereinafter.

At least one of a preferably large number of "cashing terminals" is preferably located at a number of different banks, check cashing agencies and other establishments, including retail establishments, where the bank check may be presented for redemption. The cashing terminal also preferably includes sufficient input facilities to establish what may be referred to as a second set of data. The second set of data is more specifically defined by both the account data as well as individualized payee data, which appears on the face of the check being presented for redemption. Using the cashing terminal, personnel to whom the bank check was presented for redemption, would enter the account data, preferably by optically scanning or otherwise electronically reading the pre-printed account data appearing on the bank check. In addition, at least a portion of the individualized payee data would also be entered, preferably manually through the use of a keyboard, keypad or like facilities, wherein the customized payee data entered would include at least the dollar amount or value appearing on the face of the check. Accordingly, once the account data, and at least a portion of the customized payee data, is integrated into the cashing terminal, thereby establishing the aforementioned second set of data, the second set of data would be communicated to the processing center. Once received by the processing center, a central processing unit or other processing facilities, remote or integral with the cashing terminal and/or issuing terminal would perform a comparison process between the content of the first set of data received from the issuing terminal and the content of the second set data received from the cashing terminal. A positive comparison would comprise the content of both the first and second sets of data being identical, in that the account data as well as at least the value of the check and possibly the identification of the payee appearing on the face of the check presented for redemption, would identically correspond to the same information which defines the first set of data supplied to the processing center by the issuing terminal. To the contrary, a negative comparison would result when, for example, the individualized payee data appearing on the face of the check presented for redemption has a value greater than or different from the value of that check supplied by the issuing terminal and initially stored in the processing center prior to comparison. The computer or processing facilities at the processing center would then generate either a verification signal or non-verification signal, which would be communicated directly to the cashing terminal. Upon receipt of a verification signal, personnel at the site of the cashing terminal would be authorized to redeem the check in terms of allowing its deposit, or exchanging it for cash. However, the receipt of a non-verification signal would prevent authorized redemption of the presented check and require further processing either by the processing center or the personnel at the site where the cashing terminal is located.

More specifically, the system and method of the present invention may also include the issuing of an individual access code to the company or other entity representing the payor. In situations where a check was presented by a cashing terminal to the processing center that resulted in a negative comparison, either the processing center or the site of the cashing terminal at which the check was presented could contact the personnel at the issuing terminal or issuing site and request specific authorization by requesting both specific account data and individualized payee data of a given check number. In doing so the authenticity of the information provided by the issuing company or payor could be verified by first receiving and accepting the aforementioned identifying access code, representative of the payor. Use of the access code may occur in specialized situations when, for example, one or more bank checks properly issued by the payor were inadvertently not registered with the processing center. Accordingly, data relating to an "unregistered" check presented by a cashing terminal to the processing center would result in a negative comparison, since there would be no record of the check being issued. Verification of a valid issued check could therefore be accomplished through use of the identifying access code as set forth above.

In addition to the above, the implementation of the system and method of the present invention may also include communication with a central data system of the type associated with the various automatic teller machine (ATM) networks existing throughout the country. In operation, upon completion of the issuing of the one or more bank checks by the issuing terminal, the first set of data, including both the account data and at least a portion or all of the individualized payee data, would be communicated to the central data system. The central data system would thereafter suspend or isolate funds in an equal amount to the value of the issued check. Similarly, when a check is presented for redemption and payment or deposit of the check is authorized, communication could be received from either the site of the cashing terminal or alternately from the processing center to debit the amount of the redeemed check from the suspended or isolated funds. Other data associated with the individual redeemed check could also be registered and stored in memory for subsequent communication to the issuing terminal or payor including check number identification of the payee, etc. The suspension or isolation of the funds from the account on which the one or more bank checks are drawn would further serve as security against check fraud, in that any check presented for redemption and drawn on an account of the payor would not be debited against the suspended or isolated funds, unless such check was first registered with the processing center in accordance with the system and method of the present invention, as set forth above.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
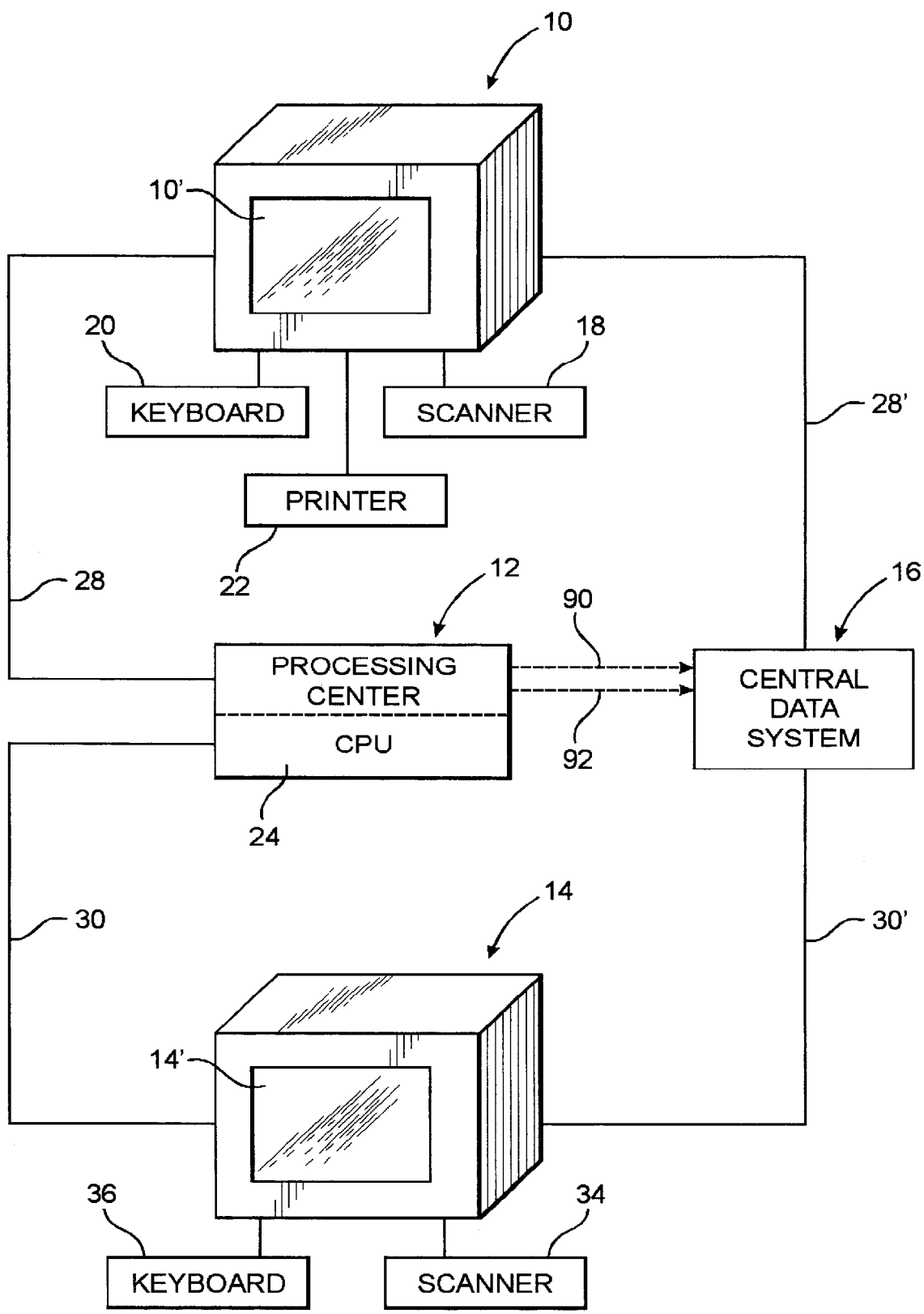
FIG. 1 is a schematic representation depicting an embodiment of the facilities utilized in the performance of the system and method of the present invention.

With reference to the accompanying Figures, the system and method of the present invention includes the use of an issuing terminal generally indicated as 10, which is representative of one or more terminals located at different issuing sites. Although an individual may have an issuing site, such as utilizing a personal computer, the issuing site is preferably the location of a payor company or other entity and/or the location of an authorized payroll company, retained by the payor to issue a plurality of checks, such as but not limited to payroll checks. The system and method of the present invention also preferably includes access to a processing center, generally indicated as 12, which is typically remotely located from the issuing site at which the issuing terminal 10 is located.

A cashing terminal, generally indicated as 14, is further included in the present system and method. The cashing terminal 14 is representative of what may be an extremely large number of cashing terminals, which may be located at a plurality of different sites, all of which are most probably remote from both the issuing terminal 10 and the processing center 12. The cashing terminal 14, by way of example only, may be located at a bank or check cashing agency where the bank check, prepared and issued from the issuing terminal 10, is presented for redemption in terms of being deposited or cashed. Additionally, the cashing terminal 14 may be representative of a large number of such terminals located at various retail establishments, which would be willing to accept the bank check as payment for goods or services provided by the retail establishment. For the purposes of this description, a bank check may include an institutionally issued check, one issued directly from a bank and/or a personal check.

In addition to the above, the system and method of the present invention may also include communication with a central data system generally indicated as 16. The central data system 16, if included, may be of the type normally associated with automatic teller machine (ATM) networks, found throughout the United States, as will be explained in greater detail hereinafter.

The issuing terminal 10 preferably includes sufficient processor and memory/storage capabilities to at least temporarily store and integrate data relating to the one or more bank checks prepared and issued thereby, and if desired can be integrated directly with a check processing and/or accounting computer by which the checks are normally issued. In preparing and issuing bank checks, the issuing terminal 10 preferably includes a first input facility, such as comprising a scanner assembly 18, and/or integral or remote connection to an accounting computer. The scanner assembly 18 can be in the form of an optical scanner or other reader designed and structured to electronically read the pre-printed account data found on the face of the bank check. The scanner assembly 18 may take a variety of forms including, but not necessarily limited to, a "swipe" scanner generally of the type used to read the magnetic strip on credit cards. A swipe-type scanner would be structurally modified to read at least the account data pre-printed on the face of the check and also could be structurally adapted to scan and electronically read the printed, individualized payee data as well if it has been entered in a machine readable form. Such pre-printed account data normally includes the payor's account number, a bank routing number and check number, as well as other possible information. Of course, the first input facility associated with the issuing terminal may also include a manually actuatable keypad or keyboard 20 of somewhat conventional design, which allows data to be entered into the processing and storage capabilities of the issuing terminal 10 if direct connection is not available at the point of issuance. More specifically, the keyboard 20 may, under some circumstances, be used for the manual inputting of individualized payee data associated with each of the plurality of bank checks being prepared. The keyboard 20 would be used to input the individualized payee data in circumstances where such payee data was not automatically printed in typical fashion, such as by computer facility or the like, and a link between the issuing terminal and the printing or accounting computer is not possible. Preferably, the payee data includes at least the name or other identification of the payee and/or the dollar amount or value of the check. Along these lines, the issuing terminal 10 preferably includes a printer or like printing facility 22, so as to produce any desired hard copy records of any data entered into and stored in the memory facilities of the issuing terminal 10 relating to the one or more checks being processed.

The processing center 12, which may be integral with or remote from the issuing and/or cashing terminals 10 and 14, is preferably computer oriented and includes a central processing unit or like facilities 24 having the ability to receive data from a plurality of different sources, at least temporarily store such data, and readily access such data, specifically but not exclusively for purposes of comparing various sets of data, at least in terms of corresponding content. More specifically, and as explained in greater detail with reference to FIG. 2, a first set of data relating to a particular bank check issued by the issuing terminal 10 and communicated and stored in the processing center 12, would be compared, as to its content, with a second set of data, received from the cashing terminal 14, and relating to the same bank check, when such bank check is presented for redemption at the site of the cashing terminal 14. In addition to the above, the processing center 12 should also be capable of communication between the issuing terminal 10 as at 28 and the cashing terminal 14 as at 30.

Also in an alternative embodiment of the present invention the communication facilities of the processing center 12 may be capable of communicating instructions and/or data information over first and second communication links 90 and 92 to the central data system 16, as will be explained in greater detail hereinafter. Communication between the processing center 12 and the issuing terminal 10, cashing terminal 14 and/or the central data system 16, may take place by conventional communication facilities including but not limited to telephone line communication, such as those performed for credit card verification. In addition to the conventional communication facilities such as an individual call based telephone communication, as set forth above, communication between the processing center 12 and in particular the issuing terminal 10, can be accomplished by network communication, such as a private and/or public network communication system. When using network communication, all data presented to the processing center 12, at least including information relating to which previously issued checks have or have not been redeemed, as well as other informative data, could be accessed over the network system link, also represented as 28, such as preferably utilizing a secure and/or encrypted connection. Such a network communication link 28, would allow personnel at the issuing terminal or other personnel authorized by the payor to find out whether a specific check has been verified and authorized for payment, as well as a particular location or site of the cashing terminal 14 where an individual check was redeemed. Naturally, the issuing terminal 10 could also be accessed to obtain and/or transmit such information, which would be communicated to the issuing terminal 14 for storage, upon completion of each check verification or non-verification by virtue of the existence of the network communication link 28. Likewise, in such an embodiment, the information on the check could include routing information wherein the cashing terminal 14 communicates directly with the issuing terminal 10, the processing center being directly associated therewith, with each issuing terminal defining its own processing center.

The cashing terminal 14 also preferably includes sufficient processing and/or storage facilities to adequately process, in the manner intended, the various data input from a second input facility, including a scanner assembly 34 and/or a manually actuatable keyboard 36. The scanner assembly 34 may be similar to scanner assembly 18, in that it may be in the form of an optical scanner, electronic reader and/or "swipe" scanner designed and structured to identify or read the pre-printed account data appearing on the face of the check, which is presented for redemption at the cashing site, such as the bank, check cashing agency, etc. as set forth above. The scanner assembly 34 located at each of the plurality of cashing terminals 14 could also be structured to electronically scan or read the payee data appearing on the check. The keypad or keyboard 36 may be connected for manually inputing all or at least a portion of the individualized payee data, which appears on the front of each of the bank checks presented for redemption in situations where the payee data is not scanned or electronically read. The cashing terminal 14 and more specifically the processing facilities associated therewith, would therefore integrate the scanned account data, as well as the individualized payee data, electronically or manually input into the terminal 14. The integration of the account data and the individualize payee data would therefore represent and establish what may be termed a second set of data.

The first set of data, having been communicated over communication facilities 28 to the processing center 12, would preferably be pre-stored, at least on a temporary basis, and does not need to be accessed until the second set of data is received over communication facility 30, from the cashing terminal 14. Other features associated with both the issuing terminal 10 and the cashing terminal 14 could include display facilities as at 10' and 14' associated with each of the terminals respectively, such that any of a plurality of signals or instructions generated by the processing center 12 could be readily communicated to the terminals directly and displayed on the display facility 10' or 14'.

Figure 2:
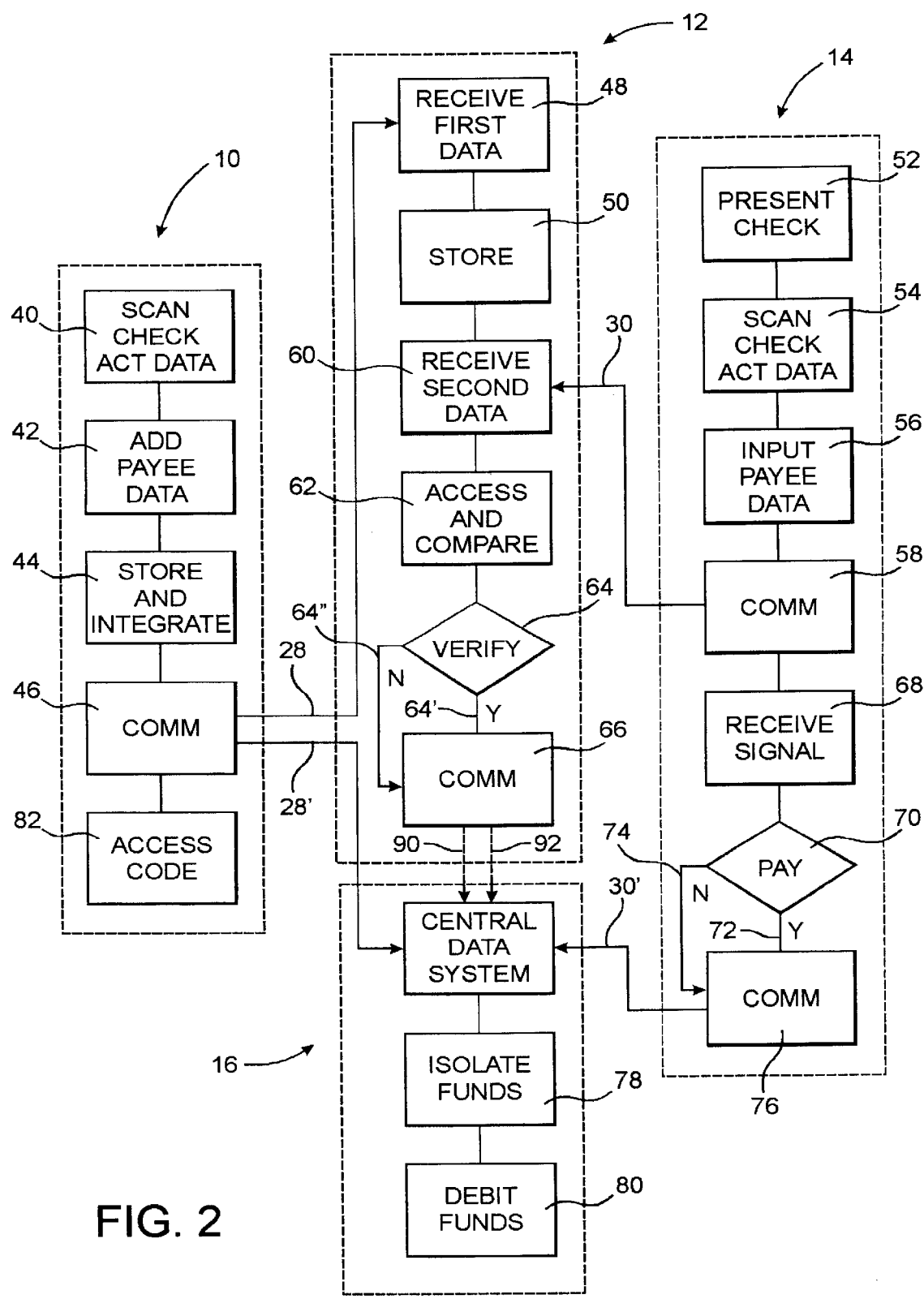
FIG. 2 is a flow chart schematically representing the various steps in the performance of an embodiment of the system and method of the present invention.

With reference to FIG. 2, the verifying and authorizing system and method of the present invention is described with regard to the preparation and processing of a single bank check. It is again to be emphasized that the system and method of the present invention is of course structured to handle a plurality of such checks, utilizing one or more issuing terminals 10, at least one processing center 12 remotely located therefrom, and a large number of cashing terminals 14, most preferably located remotely from the issuing terminal 10, the processing center 12, and the geographical location of the central data system 16.

More specifically, in the preparation of a bank check, personnel at the issuing site, where the issuing terminal 10 is located, first inputs the account data appearing in preprinted form on the face of the bank check being prepared as at 40, by optically scanning or otherwise electronically reading such account information utilizing the scanning assembly 18, as set forth above. The individualized payee data, including at least the dollar amount and name or identification of the payee, is added as at 42 to the processor of the issuing terminal 10, using the first input facility, such as the keyboard 20. However, if the payee data has been previously printed on the bank check, automatically, using conventional computer facilities or like equipment, such individualized payee data may also be electronically scanned using any of a number scanning assembly 18, structurally modified to electronically read both the account data as well as the payee data. The account data and the individualized payee data are then integrated into the storage and/or memory facility as at 44, so as to establish what may be referred to as a first set of data. This first set of data is then communicated as at 46 to the processing center 12, wherein the CPU 24 thereof receives the first set of data as at 48 and at least temporarily stores such data for later access, as at 50.

Subsequently, the bank check is presented for redemption at a cashing site such as a bank, check cashing agency, retail establishment, etc. where at least one cashing terminal 14 is preferably located. Of course, a manual calling in of the data, if present in a manually readable form on the check, to the processing center can also be accomplished. Preferably, however, when the check is presented as at 52, the account data appearing on the face thereof is optically scanned or otherwise electronically read or manually entered, so as to input such data into the processing and storage facility of the cashing terminal 14. The individualized payee data appearing on the presented check is also input either using keyboard 36, as at 56 or using the second scanner assembly 34. The integration into the processing facilities of the cashing terminal 14, of both the account data and the individualized payee data, which appears on the face of the presented bank check, thereby serves to define and establish what may be termed a second set of data. The second set of data, once established, is then communicated as at 58, using applicable communication facilities 30, to the processing center 12. The second set of data is received as at 60 at the processing center 12, wherein the CPU 24 of the processing center 12 serves to access the previously stored first set of data and directly compare as at 62, the content thereof with the second set of data received from the cashing terminal 14. Access to the first set of data of any given bank check can be readily accomplished by the CPU 24, due to the matching of the account data at least in terms of identity of the payor as well as the number of the bank check. The comparison as at 62 of first and second sets of data associated with any one bank check will result in the CPU 24 generating either a verification signal 64' or a non-verification signal " as at 64. The generation of a verification signal 64' will result when a positive comparison is made to the extent that the content of the first and second sets of data identically correspond. However, a negative comparison results in the generation of the non-verification signal 64", when the content of the first and second sets of data do not identically correspond, thereby indicating a possibility of check fraud. By way of example, if a bank check is presented at the cashing terminal 14, wherein a value of the check or the identification of the payee thereon has been altered, the CPU 24 at the processing center 12, will be programmed to generate a non-verification signal 64", since the content of the first and second sets of data would not be identical.

Subsequent to the comparison as at 62, the CPU 24 will generate either the verification signal 64' or a non-verification signal 64" which will be communicated as at 66 to the cashing terminal 14 and received as at 68. The generated verification signal 64' will be displayed at 14' on the cashing terminal 14 and the personnel there will have an authorization of payment as at 70 resulting in redemption of the check as at 72. If a non-verification signal is generated as at 64", such non-verification signal is communicated as at 66 to the cashing terminal 14 and payment or redemption of the presented check as at 74 will be prevented. As set forth above, communication as by communication link 28 between the issuing terminal 10 and the processing center 12 may be by network communication, wherein data entered and processed in terms of individual bank checks presented for redemption at any one of a plurality of cashing terminals 14, would be immediately accessible at the site of the issuing terminal 10 or another dedicated site. This would allow personnel at the issuing terminal 10 or at a site of the payor to immediately determine whether any given check, which has been previously issued has been presented for redemption and also clearly indicate the location and/or identification of the site in terms of identifying the cashing terminal 14 where the presented check was verified and authorized for payment.

With regard to the inclusion of communication with the central data system 16, at least a first communication 28' may exist between the issuing terminal 10 and the central data system 16, wherein the first set of data or at least a portion thereof is communicated to the central data system for purposes of suspending or isolating funds from the account on which the bank check is drawn at least equal to the amount of the value of the check. Such communication is also indicated in FIG. 2 as 28'. Upon receipt of at least a portion of the first set of data, the central data system will serve to separate or isolate the funds as at 78. Subsequently, when the bank check presented at the cashing terminal 14 has been verified as to its authenticity and payment has been authorized as at 72, the cashing terminal 14 or at least personnel at the site thereof, may also communicate with the central data system 16 as at 30', wherein the amount or value of the bank check presented at the cashing terminal 14 would be debited as at 80, from the funds which have been previously suspended or isolated as at 78.

As an alternate embodiment, initial communication with the central data system 16 for purposes of supplying the first set of data thereto can occur between the processing center 12 and the central data system 16 as at 90 rather than having such communication occur directly between the issuing terminal 10 and the central data system 16 by the first communication link 28'. Similarly once the presented check has been verified and authorized for payment at the cashing terminal 14, the processing center 12 can further provide instructions to the central data system 16 as at 92 for purpose of debiting funds as at 80 from the isolated or suspended funds associated with the bank check. In this alternative embodiment, perhaps additional security features would be added since the plurality of cashing terminals 14 and more particularly the rather large number of cashing sites, where such cashing terminals 14 are located would not have any access to the account information of the payor.

As yet another alternate embodiment, the present invention contemplates the use of an identifying access code as at 82 assigned to the issuing company and/or payor for the purpose of identification and authorization by the payor. More specifically, if an issued check is cashed, or not registered or otherwise communicated to the processing center 12, any such check, later submitted for redemption to a cashing terminal 14, will of course not be verified since there would be no record at the processing center 12 of the existence of such a check and a person at the cashing terminal could be notified of the status of that check. At that point either the cashing terminal 14 or the processing center 12 could communicate, by telephone communication or any other applicable means, with the issuing terminal 10 or personnel of the payor, located at the issuing site and attempt to identify the presented bank check, at least in terms of the account data and a portion of the individualized payee data. Proof that the data received by telephone from the payor was authentic would be verified by the payor supplying the identifying access code as at 82.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A system for verifying an authenticity of a bank check, said system comprising:
   a) an issuing terminal, said issuing terminal including a first input facility structured to generate a first set of data;
   b) a cashing terminal, said cashing terminal disposed remote from said issuing terminal and including a second input facility structured to generate a second set of data;
   c) said first set of data and said second set of data each comprising pre-printed account data and individualized payee data appearing on the same bank check,
   d) a processing center communicatively disposed with said issuing terminal and said cashing terminal for receipt of said first and second sets of data;
   e) a central processing unit, said central processing unit disposed in association with said processing center and structured to compare said first and second sets of data; and
   f) said central processing unit further structured to communicate a verification signal or a non-verification signal to said cashing terminal upon determination of a positive comparison or a negative comparison, respectively, of the content of said first and second sets of data.

2. A system as recited in claim 1 wherein said first input facility comprises a first scanner assembly structured to read at least account data pre-printed on the bank check.

3. A system as recited in claim 2 wherein said first scanner assembly is further structured to read individualized payee data appearing on the bank check.

4. A system as recited in claim 3 wherein said individualized payee data includes at least a check value.

5. A system as recited in claim 3 wherein said second input facility is structured to read data appearing on the bank check at least partially comprising a portion of said second set of data.

6. A system as recited in claim 3 wherein said second input facility comprises a second scanner assembly structured to read at least account data imprinted on the bank check.

7. A system as recited in claim 6 wherein said second scanner assembly is further structured to read individualized payee data appearing on the bank check.

8. A system as recited in claim 1 wherein said positive comparison comprises said first and second sets of data appearing on the same bank check being identical and said negative comparison comprising said second set of data appearing on the same bank check differing from said first set of data.

9. A system as recited in claim 1 further comprising a central data system including a first communication link for receiving said first set of data and a second communication link for receiving said second set of data.

10. A system as recited in claim 9 wherein said second set of data is received subsequent to said positive comparison.

11. A system as recited in claim 10 wherein said first and second communication links are established between said processing center and said central data system.

12. A system as recited in claim 11 wherein said first set of data is communicated from said issuing terminal to said processing center and from said processing center to said central data system.

13. A system as recited in claim 12 wherein said second set of data is communicated from said cashing terminal to said processing center, and subsequent to said positive comparison, from said processing center to said central data system.

14. A system as recited in claim 9 wherein said first communication link is established between said issuing terminal and said central data system, said first set of data being communicated directly from said issuing terminal over said first communication link to said central data system.

15. A system as recited in claim 14 wherein said second communication link is established between said cashing terminal and said central data system, said second set of data being communicated from said cashing terminal over said second communication link to said central data system subsequent to receipt of said verification signal from said processing center.

16. A system as recited in claim 9 wherein said central data system is further responsive to instructions over said first communication link to isolate funds of the account of the bank check at least in an amount equal to the value of the bank check.

17. A system as recited in claim 16 wherein said central data system is further responsive to instructions over said second communication link to debit the value of the bank check from said isolated funds subsequent to determination of said positive comparison and receipt of said verification signal at said cashing terminal.

18. A method of verifying authenticity and authorizing payment of a bank check, said method comprising steps of:
   a) establishing a first set of data appearing on a given bank check by integrating pre-printed account data with individualized payee data at an issuing site during issuing of the given bank check;
   b) communicating said first set of data on the given bank check to a processing site for storage and comparison;
   c) establishing a second set of data from pre-printed account data and individualized payee data appearing on the given bank check at a cashing site during redemption of the given bank check;
   d) communicating said second set of data to the processing site and comparing the second set of data appearing on the given bank check to said first set of data appearing on the given bank check, and
   e) generating a verification signal or a non-verification signal indicative of payment authorization based on a positive comparison or a negative comparison, respectively, of said first and said second sets of data.

19. A method as recited in claim 18 comprising the steps of:
   communicating the first set of data to the processing site for temporary storage substantially concurrent to issuing the given bank check, and
   communicating the second set of data to the processing site for comparison upon presentation of the given bank check for deposit or cashing.

20. A method as recited in claim 19 further comprising the step of electronically reading the pre-printed account data and manually entering the individualized payee data into a memory facility at the issuing site to establish the first set of data.

21. A method as recited in claim 20 further comprising the steps of:
   electronically reading the predetermined account data, and
   manually entering the individualized payee data into a memory facility at the cashing site to establish the second set of data.

22. A method as recited in claim 18 further comprising the step of communicating the first set of data to a central data system and isolating the funds associated with the pre-printed account data in an amount at least equal to the value of the given bank check.

23. A method as recited in claim 22 comprising the step of debiting the value of the given bank check from the isolated funds only subsequent to determining a positive comparison between said first and second sets of data.

24. A method of verifying authenticity and authorizing payment of a bank check, said method comprising steps of:

a) integrating pre-printed account data on a given bank check with individualized payee data to establish a first set of data, b) communicating the first set of data to a processing site for temporary storage and subsequent comparison, c) communicating the first set of data to a central data system to isolate funds associated with the pre-printed account data in an amount at least equal to the value of the given bank check, d) establishing a second set of data upon presentation of the given bank check for redemption, the second set of data comprising the pre-printed account data and the individualized payee data appearing on the given bank check at the time of presentation, e) communicating the second set of data to the processing site, f) comparing the second set of data with the first set of data to determine an existence of equivalent content thereof, g) generating a verification signal or a non-verification signal indicative of payment authorization based on a positive comparison or a negative comparison, respectively, of the first and second sets of data, h) communicating the generated signal to a redemption site, and i) instructing the central data system to debit the value of the given bank check from the isolated funds only in the event of a positive comparison between said first and second sets of data on the given bank check.

* * * * *